United States Patent
Balogh et al.

(10) Patent No.: US 10,892,481 B2
(45) Date of Patent: Jan. 12, 2021

(54) METHODS OF PRE-LITHIATING ELECTROACTIVE MATERIAL AND ELECTRODES INCLUDING PRE-LITHIATED ELECTROACTIVE MATERIAL

(71) Applicant: GM GLOBAL TECHNOLOGY OPERATIONS LLC, Detroit, MI (US)

(72) Inventors: Michael P. Balogh, Novi, MI (US); Ion C. Halalay, Grosse Pointe Park, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/275,040

(22) Filed: Feb. 13, 2019

(65) Prior Publication Data

US 2020/0259174 A1 Aug. 13, 2020

(51) Int. Cl.
| | |
|---|---|
| *H01M 4/38* | (2006.01) |
| *H01M 4/04* | (2006.01) |
| *H01M 4/134* | (2010.01) |
| *H01M 4/1395* | (2010.01) |
| *H01M 4/62* | (2006.01) |
| *C22C 1/05* | (2006.01) |
| *H01M 10/0525* | (2010.01) |
| *H01M 4/02* | (2006.01) |

(52) U.S. Cl.
CPC ............ *H01M 4/386* (2013.01); *C22C 1/056* (2013.01); *H01M 4/0404* (2013.01); *H01M 4/134* (2013.01); *H01M 4/1395* (2013.01); *H01M 4/622* (2013.01); *H01M 4/625* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 7,736,805 | B2 | 6/2010 | Nazri et al. |
| 8,101,152 | B1 | 1/2012 | Halalay et al. |
| 8,399,138 | B2 | 3/2013 | Timmons |
| 8,420,259 | B2 | 4/2013 | Xiao et al. |
| 8,440,350 | B1 | 5/2013 | Verbrugge et al. |
| 8,642,201 | B2 | 2/2014 | Cheng et al. |
| 8,658,295 | B2 | 2/2014 | Cheng et al. |
| 8,679,680 | B2 | 3/2014 | Vanimisetti et al. |
| 8,828,481 | B2 | 9/2014 | Burton et al. |
| 8,835,056 | B2 | 9/2014 | Xiao et al. |
| 9,012,075 | B2 | 4/2015 | Verbrugge et al. |

(Continued)

OTHER PUBLICATIONS

Yamane, Hisanori et al., "Preparation of Lithium Silicon Nitrides and their Lithium Ion Conductivity," Solid State Ionics 25 (1987), pp. 183-191.

*Primary Examiner* — William D Young
(74) *Attorney, Agent, or Firm* — Harness, Dickey & Pierce, P.L.C.

(57) ABSTRACT

Methods for pre-lithiating an electroactive material including a Group III element, Group IV element, a Group V element, or a combination thereof for an electrode for an electrochemical cell are provided as well as electrodes including the pre-lithiated electroactive material. The methods include reacting a lithiating agent including LiH or $Li_3N$ with the electroactive material to form a pre-lithiated electroactive material.

6 Claims, 3 Drawing Sheets

(56) References Cited

U.S. PATENT DOCUMENTS

| | | |
|---|---|---|
| 9,034,519 B2 | 5/2015 | Xiao et al. |
| 9,093,705 B2 | 7/2015 | Xiao et al. |
| 9,142,830 B2 | 9/2015 | Xiao et al. |
| 9,153,819 B2 | 10/2015 | Huang et al. |
| 9,356,281 B2 | 5/2016 | Verbrugge et al. |
| 9,362,551 B2 | 6/2016 | Sachdev et al. |
| 9,362,552 B2 | 6/2016 | Sohn et al. |
| 9,379,374 B2 | 6/2016 | Liu et al. |
| 9,583,767 B2 | 2/2017 | Verbrugge et al. |
| 9,905,847 B2 | 2/2018 | Dadheech et al. |
| 9,923,189 B2 | 3/2018 | Xiao |
| 10,141,569 B2 | 11/2018 | Verbrugge et al. |
| 2012/0100403 A1 | 4/2012 | Wang et al. |
| 2012/0229096 A1 | 9/2012 | Nazri |
| 2012/0328927 A1 | 12/2012 | Timmons et al. |
| 2013/0099159 A1 | 4/2013 | Halalay et al. |
| 2017/0092950 A1 | 3/2017 | Xiao et al. |
| 2017/0098817 A1 | 4/2017 | Yu et al. |
| 2017/0179469 A1 | 6/2017 | Jiang et al. |
| 2017/0271678 A1 | 9/2017 | Yang et al. |
| 2017/0324119 A1 | 11/2017 | Powell, Jr. et al. |
| 2017/0338490 A1 | 11/2017 | Xiao et al. |
| 2018/0083268 A1 | 3/2018 | Huang |
| 2018/0123124 A1 | 5/2018 | Yang et al. |
| 2018/0287139 A1 | 10/2018 | Xiao et al. |
| 2019/0341602 A1* | 11/2019 | Matsuno ............... H01M 4/625 |

* cited by examiner

METHODS OF PRE-LITHIATING ELECTROACTIVE MATERIAL AND ELECTRODES INCLUDING PRE-LITHIATED ELECTROACTIVE MATERIAL

FIELD

The present disclosure relates to methods for pre-lithiating electroactive material, such as silicon-containing electroactive material, for electrodes for lithium ion electrochemical devices and electrodes including such pre-lithiated electroactive material.

BACKGROUND

This section provides background information related to the present disclosure which is not necessarily prior art.

High-energy density, electrochemical cells, such as lithium ion batteries can be used in a variety of consumer products and vehicles, such as Hybrid Electric Vehicles (HEVs) and Electric Vehicles (EVs). Typical lithium ion batteries comprise a first electrode (e.g., a cathode), a second electrode of opposite polarity (e.g., an anode), an electrolyte material, and a separator. Conventional lithium ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery. For convenience, a negative electrode will be used synonymously with an anode, although as recognized by those of skill in the art, during certain phases of lithium ion cycling the anode function may be associated with the positive electrode rather than negative electrode (e.g., the negative electrode may be an anode on discharge and a cathode on charge).

In various aspects, an electrode includes an electroactive material. Negative electrodes typically comprise such an electroactive material that is capable of functioning as a lithium host material serving as a negative terminal of a lithium ion battery. Conventional negative electrodes include the electroactive lithium host material and optionally another electrically conductive material, such as carbon black particles, as well as one or more polymeric binder materials to hold the lithium host material and electrically conductive particles together.

Typical electroactive materials for forming a negative electrode (e.g., an anode) in a lithium ion electrochemical cell include lithium-graphite intercalation compounds, lithium-silicon alloys, lithium-tin compounds, and other lithium alloys While graphite compounds are most common, recently, anode materials with high specific capacity (in comparison with conventional graphite) are of growing interest. For example, silicon has one of the highest known theoretical capacities for lithium, making it one of the most attractive alternatives to graphite as a negative electrode material for rechargeable lithium ion batteries. However, current silicon anode materials suffer from significant drawbacks. For example, silicon-containing materials experience large volume changes (e.g., volume expansion/contraction) during lithium insertion/extraction (e.g., intercalation and deintercalation). Thus, cracking of the negative electrode (e.g., anode), a decline of electrochemical cyclic performance and large Coulombic charge capacity loss (capacity fade), and extremely limited cycle life are often observed during cycling of conventional silicon-containing electrodes. Additionally, current silicon electrode materials as well as other high specific capacity materials can suffer from first cycle active lithium losses from the positive electrode, for example, caused by formation of a solid electrolyte interphase (SEI) layer at the negative electrode, which limits battery performance. High specific capacity materials can also suffer from additional ongoing active lithium loss due to continuous SEI breakage and re-formation caused by the aforementioned large volume changes. This loss of active lithium can permanently decrease the available energy of the battery.

It would be desirable to develop methods for preparing high performance electrode materials, particularly comprising silicon, for use in high energy and high power lithium ion batteries, which overcome the current shortcomings that prevent their widespread commercial use, especially in vehicle applications. For long term and effective use, high specific capacity electrode materials, such as silicon, should be capable of minimal capacity fade and maximized charge capacity for long-term use in lithium ion batteries.

SUMMARY

This section provides a general summary of the disclosure and is not a comprehensive disclosure of its full scope or all of its features.

In certain aspects, the present disclosure provides a method of pre-lithiating an electroactive material for an electrode for an electrochemical cell. The method includes reacting a first lithiating agent including LiH with the electroactive material to form a pre-lithiated electroactive material. The electroactive material includes a Group III element, a Group IV element, a Group V element, or a combination thereof, and the pre-lithiated electroactive material includes a lithium-containing metallic compound including the Group III element, the Group IV element, the Group V element, or a combination thereof.

Reacting the first lithiating agent with the electroactive material can include one or more of: (i) heating the first lithiating agent and the electroactive material in the presence of a first inert gas; and (ii) mechanically alloying the first lithiating agent and the electroactive material in the presence of a second inert gas.

The first lithiating agent and the electroactive material can be heated to a temperature of greater than or equal to about 350° C.

The Group III element can be selected from the group consisting of boron, aluminum, and a mixture thereof, the Group IV element can be selected from the group consisting of silicon, germanium, tin, and a mixture thereof, and the Group V element can be selected from the group consisting of arsenic, antimony, phosphorus, and a mixture thereof.

The electroactive material can include silicon and the lithium-containing metallic compound can be a lithium silicide.

The lithium silicide can be selected from the group consisting of $Li_7Si_3$, $Li_{13}Si_4$, $Li_{21}Si_5$, $Li_{12}Si_7$, $Li_{4.7}Si_2$, and a combination thereof.

The method can further include admixing an electrically conductive material with the pre-lithiated electroactive material. The electrically conductive material can be selected from the group consisting of carbon black, graphite, carbon nanotubes, carbon fibers, nitrogen-doped carbon, and combinations thereof.

The method can further include admixing a solvent with a polymeric binder and the pre-lithiated electroactive material to form a mixture, applying the mixture to a current collector, and volatilizing the mixture to form the electrode. The solvent can be selected from the group consisting of: N-methyl-2-pyrrolidone (NMP), dimethylformamide (DMF), dimethyl sulfoxide, propylene carbonate, acetonitrile, tetrahydrofuran, and combinations thereof.

In yet other aspects, the present disclosure provides another method of pre-lithiating an electroactive material for an electrode for an electrochemical cell. The method includes reacting a second lithiating agent including $Li_3N$ with the electroactive material to form a pre-lithiated electroactive material. The electroactive material includes boron, aluminum, silicon, germanium, tin, arsenic, antimony, phosphorus, or a mixture thereof, and the pre-lithiated electroactive material includes a lithium nitride-containing metallic compound comprising boron, aluminum, silicon, germanium, tin, arsenic, antimony, phosphorus, or a mixture thereof.

Reacting the second ithiating agent with the electroactive material can include one or more of: (i) heating the second lithiating agent and the electroactive material in the presence of a first inert gas; and (ii) mechanically alloying the second lithiating agent and the electroactive material in the presence of a second inert gas.

The second lithiating agent and the electroactive material can be heated to a temperature of greater than or equal to about 350° C.

The electroactive material can include silicon and the lithium nitride-containing metallic compound can be a lithium silicon nitride.

The lithium silicon nitride can be selected from the group consisting of $Li_2SiN_3$, $Li_5SiN_3$, $LiSi_2N_3$, $Li_{18}Si_3N_{10}$, $Li_{21}Si_{13}N_{11}$, $Li_8SiN_4$, and a combination thereof.

The method can further include admixing an electrically conductive material with the pre-lithiated electroactive material. The electrically conductive material can be selected from the group consisting of carbon black, graphite, carbon nanotubes, carbon fibers, nitrogen-doped carbon, and combinations thereof.

The method can further include admixing a solvent with a polymeric binder and the pre-lithiated electroactive material to form a mixture, applying the mixture to a current collector, and volatilizing the mixture to form the electrode. The solvent can be selected from the group consisting of: N-methyl-2-pyrrolidone (NMP), dimethylformamide (DMF), dimethyl sulfoxide, propylene carbonate, acetonitrile, tetrahydrofuran, and combinations thereof.

In yet other aspects, the present disclosure provides a negative electrode for an electrochemical cell. The negative electrode includes a pre-lithiated electroactive material including one or more of: (i) a lithium-containing metallic compound; and (ii) lithium nitride-containing metallic compound; an electrically conductive material; and a polymeric binder. The lithium-containing metallic compound includes a Group III element, a Group IV element, a Group V element or a combination thereof. The lithium nitride-containing metallic compound includes a Group III element, a Group IV element, a Group V element or a combination thereof. The negative electrode is in a state prior to incorporation and/or operation in an electrochemical cell.

The Group III element can be selected from the group consisting of boron, aluminum, and a mixture thereof, the Group IV element can be selected from the group consisting of silicon, germanium, tin, and a mixture thereof, and the Group V element can be selected from the group consisting of arsenic, antimony, phosphorus, and a mixture thereof.

The lithium in the lithium-containing metallic compound and the lithium in the lithium nitride-containing metallic compound can each be derived from LiH, $Li_3N$, or a combination thereof.

The lithium-containing metallic compound can be a lithium silicide and the lithium nitride-containing metallic compound can be a lithium silicon nitride. The lithium silicide can be selected from the group consisting of $Li_7Si_3$, $Li_{13}Si_4$, $L_{21}Si_5$, $Li_{12}Si_7$, $Li_{4.7}Si_2$, and a combination thereof. The lithium silicon nitride can be selected from the group consisting of $Li_2SiN_3$, $Li_5SiN_3$, $LiSi_2N_3$, $Li_{18}Si_3N_{10}$, $Li_{21}Si_{13}N_{11}$, $Li_8SiN_4$, and a combination thereof.

The electrically conductive material can be selected from the group consisting of carbon black, graphite, carbon nanotubes, carbon fibers, nitrogen-doped carbon, and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," "attached to," or "coupled to" another element or layer, it may be directly on, engaged, connected, attached or coupled to the other component, element, or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure pertains to high-performance lithium ion electrochemical cells (e.g., lithium ion batteries) having improved electrodes and methods of making the same. In lithium ion electrochemical cells or batteries, a negative electrode typically includes a lithium insertion material or an alloy host material. As discussed above, conventional electroactive materials for forming a negative electrode or anode include lithium-graphite intercalation compounds, lithium-silicon alloys, lithium-tin compounds, and other lithium alloys. While graphite compounds are most commonly used, certain anode materials with high specific capacity (in comparison with conventional graphite) are of growing interest. Silicon (Si), silicon oxide, and tin are attractive alternatives to graphite as an anode material for rechargeable lithium ion batteries due to their high theoretical capacity. However, large capacity negative electrodes can suffer from a large irreversible capacity loss during the first cycle (i.e., "formation process") due to a permanent loss of lithium ions from the positive electrode, for example, due to the formation of an SEI layer on the negative electrode during the first cycle as well as ongoing lithium loss due to continuous SEI breakage. This permanent loss of lithium ions can result in a decreased specific energy and power in the battery due to the added positive electrode mass that does not participate in the reversible operation of the battery. These challenges have been a barrier to their widespread use in lithium ion batteries. Thus, methods of pre-lithiating electrodes, i.e., adding lithium to the active lithium content prior to battery operation, as well as pre-lithiated electrodes are needed to compensate for the loss of lithium ions, to decrease battery cost, and to maximize specific power and energy.

The present disclosure provides improved electrodes and methods of making improved electrodes for an electrochemical cell, which can address the above-described challenges. In particular, the present disclosure provides methods of pre-lithiating an electroactive material. Advantageously, the methods described herein can pre-lithiate electroactive material prior to the electrode fabrication process and electrochemical formation process. Additionally, the methods described herein advantageously do not require the use of stabilized lithium metallic powder, which can cause fires during electrode fabrication and electrochemical cell assembly.

Figure 1:
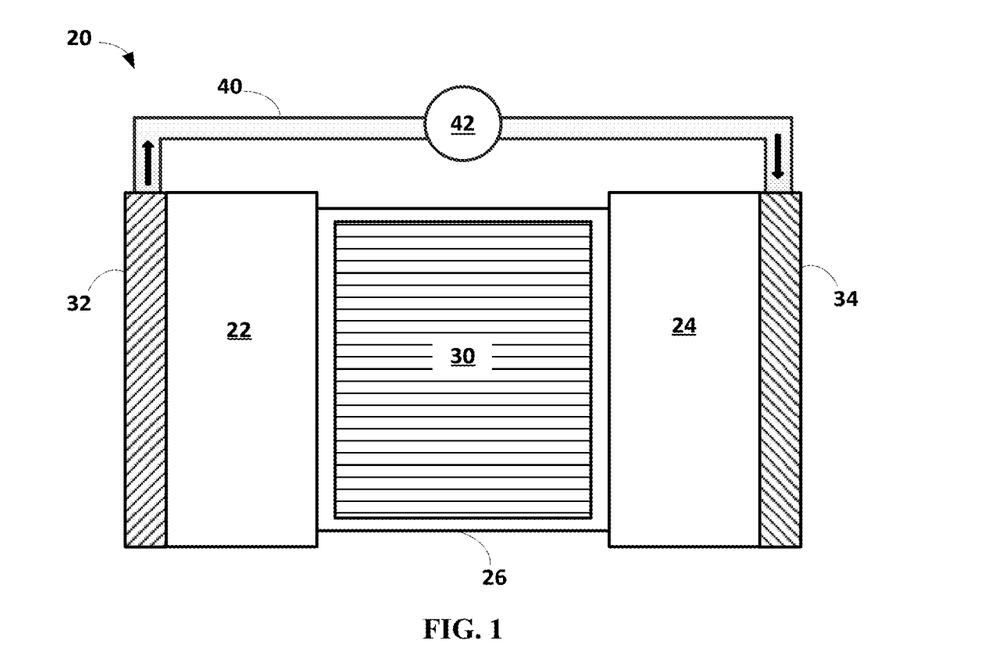
FIG. 1 is a schematic of an exemplary electrochemical battery cell.

As background, electrochemical cells, especially rechargeable lithium ion batteries, may be used in vehicle or other mobile applications. An exemplary and schematic illustration of a lithium ion battery 20 is shown in FIG. 1. Lithium ion battery 20 includes a negative electrode 22, a positive electrode 24, and a separator 26 (e.g., a microporous polymeric separator) disposed between the two electrodes 22, 24. The space between (e.g., the separator 26) the negative electrode 22 and positive electrode 24 can be filled with the electrolyte 30. If there are pores inside the negative electrode 22 and positive electrode 24, the pores may also be filled with the electrolyte 30. In alternative embodiments, a separator 26 is not included if a solid electrolyte is used. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the lithium ion battery 20.

The lithium ion battery 20 can generate an electric current during discharge by way of reversible electrochemical reactions that occur when the external circuit 40 is closed (to connect the negative electrode 22 and the positive electrode 24) when the negative electrode 22 contains a relatively greater quantity of inserted lithium. The chemical potential difference between the positive electrode 24 and the negative electrode 22 drives electrons produced by the oxidation of inserted lithium at the negative electrode 22 through the external circuit 40 toward the positive electrode 24. Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 40 can be harnessed and directed through the load device 42 until the inserted lithium in the negative electrode 22 is depleted and the capacity of the lithium ion battery 20 is diminished.

The lithium ion battery 20 can be charged or re-powered at any time by connecting an external power source to the lithium ion battery 20 to reverse the electrochemical reactions that occur during battery discharge. The connection of an external power source to the lithium ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with inserted lithium for consumption during the next battery discharge cycle. The external power source that may be used to charge the lithium ion battery 20 may vary depending on the size, construction, and particular end-use of the lithium ion battery 20. Some notable and exemplary external power sources include, but are not limited to, an AC wall outlet and a motor vehicle alternator. In many lithium ion battery configurations, each of the negative current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package.

Furthermore, the lithium ion battery 20 can include a variety of other components that while not depicted here are nonetheless known to those of skill in the art. For instance, the lithium ion battery 20 may include a casing, gaskets, terminal caps, and any other conventional components or materials that may be situated within the battery 20, including between or around the negative electrode 22, the positive electrode 24, and/or the separator 26, by way of non-limiting example. As noted above, the size and shape of the lithium ion battery 20 may vary depending on the particular application for which it is designed. Battery-powered vehicles and hand-held consumer electronic devices, for example, are two examples where the lithium ion battery 20 would most likely be designed to different size, capacity, and power-output specifications. The lithium ion battery 20 may also be connected in series or parallel with other similar lithium ion cells or batteries to produce a greater voltage output and power density if it is required by the load device 42.

Accordingly, the lithium ion battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the lithium ion battery 20 for purposes of storing energy.

Any appropriate electrolyte 30, whether in solid form or solution, capable of conducting lithium ions between the negative electrode 22 and the positive electrode 24 may be used in the lithium ion battery 20. In certain aspects, the electrolyte solution may be a non-aqueous liquid electrolyte solution that includes a lithium salt dissolved in an organic solvent or a mixture of organic solvents. Numerous conventional non-aqueous liquid electrolyte 30 solutions may be employed in the lithium ion battery 20. A non-limiting list of lithium salts that may be dissolved in an organic solvent to form the non-aqueous liquid electrolyte solution include $LiPF_6$, $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, and combinations thereof. These and other similar lithium salts may be dissolved in a variety of organic solvents, including but not limited to various alkyl carbonates, such as cyclic carbonates (ethylene carbonate (EC), propylene carbonate (PC), butylene carbonate(BC)), acyclic carbonates (dimethyl carbonate (DMC), diethyl carbonate (DEC), ethylmethylcarbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The separator 26 may comprise, in one embodiment, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also comprise other polymers in addition to the polyolefin such as, but not limited to, polyethylene terephthalate (PET), polyvinylidene fluoride (PVDF), and/or a polyamide. The polyolefin layer, and any other optional polymer layers, may further be included in the microporous polymer separator 26 as a fibrous layer to help provide the microporous polymer separator 26 with appropriate structural and porosity characteristics. Various conventionally available polymers and commercial products for forming the separator 26 are contemplated, as well as the many manufacturing methods that may be employed to produce such a microporous polymer separator 26.

The positive electrode 24 may be formed from a lithium-based active material that can sufficiently undergo lithium intercalation and deintercalation while functioning as the positive terminal of the lithium ion battery 20. The positive electrode 24 may also include a polymeric binder material to structurally fortify the lithium-based active material and an electrically conductive material. One exemplary common class of known materials that can be used to form the positive electrode 24 is layered lithium transitional metal oxides. For example, in certain embodiments, the positive electrode 24 may comprise at least one spinel comprising a transition metal like lithium manganese oxide ($Li_{(1+x)}Mn_{(2-x)}O_4$), where 0≤x≤1, where x is typically less than 0.15, including $LiMn_2O_4$, lithium manganese nickel oxide ($LiMn_{(2-x)}Ni_xO_4$), where 0≤x≤1 (e.g., $LiMn_{1.5}Ni_{0.5}O_4$), lithium cobalt oxide ($LiCoO_2$), lithium manganese oxide ($LiMn_2O_4$), lithium nickel oxide ($LiNiO_2$), a lithium nickel manganese cobalt oxide ($Li(Ni_xMn_yCo_z)O_2$), where 0≤x≤1, 0≤y≤1, 0≤z≤1, and x+y+z=1, including $LiMn_{0.33}Ni_{0.33}Co_{0.33}O_2$, a lithium nickel cobalt metal oxide ($LiNi_{(1-x-y)}Co_xM_yO_2$), where 0<x<1, y<1, and M may be Al, Mn, or the like, other known lithium-transition metal oxides or mixed oxides lithium iron phosphates, or a lithium iron polyanion oxide such as lithium iron phosphate ($LiFePO_4$) or lithium iron fluorophosphate ($Li_2FePO_4F$). Such active materials may be intermingled with a conductive filler material, such as carbon black or graphite, and at least one polymeric binder. Active materials can be slurry cast with other components, including binders like polyvinylidene fluoride (PVDF), ethylene propylene diene monomer (EPDM) rubber, polyacrylic acid (PAA) or carboxymethoxyl cellulose (CMC). The positive current collector 34 may be formed from aluminum or any other appropriate electrically conductive material known to those of skill in the art.

The positive current collector 34 may be formed from aluminum or any other appropriate electrically conductive material known to those of skill in the art.

In various aspects, the negative electrode 22 includes an electroactive material as a lithium host material capable of functioning as a negative terminal of a lithium ion battery. The negative current collector 32 may be formed from copper or any other appropriate electrically conductive material known to those of skill in the art. The negative electrode 22 can include a lithium host or negative electroactive materials and optionally, another electrically conductive material (also referred to as "electrically conductive filler material"), as well as one or more polymeric binder materials to structurally hold the lithium host material together. Such negative electroactive materials may be intermingled with the electrically conductive material and at least one polymeric binder. The polymeric binder can create a matrix retaining the negative electroactive materials and electrically conductive material in position within the electrode. Polymeric binder can fulfill multiple roles in an electrode, including: (i) enabling the electronic and ionic conductivities of the composite electrode, (ii) providing the electrode integrity, e.g., the integrity of the electrode and its components, as well as its adhesion with the current collector, and (iii) participating in the formation of solid electrolyte interphase (SEI), which plays an important role as the kinetics of lithium intercalation is predominantly determined by the SEI.

As discussed above, large capacity negative electrodes can suffer a permanent loss of lithium ions from the positive electrode during the first cycle resulting in decreased specific energy and power in the battery. The present technology however addresses the issues found in conventional electrodes and methods of making the same and provides methods for preparing high-performance electrodes, such as silicon-containing anodes, having advantageous electrochemical performance capabilities, as well as longevity for long-term use in rechargeable lithium ion electrochemical cells.

In conventional processes of forming electrodes, particles of electroactive materials and optional electrically conductive filler material may be mixed with a binder to form a slurry and the slurry can be cast onto a current collector. After a solid porous negative electrode is formed, it may be further imbibed with electrolyte. In accordance with various aspects of the present disclosure, methods of pre-lithiating an electroactive material are provided. The methods include reacting a lithiating agent with the electroactive material to form a pre-lithiated electroactive material. The pre-lithiated electroactive material may then be used to prepare an electrode. It is contemplated herein that the methods described can be used to prepare a negative electrode (an anode).

In various aspects, the lithiating agent may include lithium hydride (LiH), lithium nitride ($Li_3N$), or a combination thereof. In some embodiments, a first lithiating agent may include lithium hydride (LiH) and a second lithiating agent may include lithium nitride ($Li_3N$). In any embodiment, the lithiating agent in a suitable amount can be combined with the electroactive material in any suitable manner known in the art for example, by using a mixing mill. In any embodiment, the electroactive material can comprise a Group III element, a Group IV element, a Group V element, or a combination thereof. Preferably, the Group III element is a metal. Non-limiting examples of suitable Group III elements include boron (B), and aluminum (Al). Preferably, the Group IV element is a metal. Non-limiting examples of suitable Group IV elements include silicon (Si), germanium (Ge), tin (Sn), and mixtures thereof. Non-limiting examples of suitable Group V elements include arsenic (As), antimony (Sb), phosphorus (P) and mixtures thereof. Preferably, the Group IV element is a metal. In any embodiment, the aforementioned metals may include a dopant. For example, a Group IV element (e.g., Si) can be doped with a Group III element (e.g., B), a Group V element (e.g., P), or a combination thereof. In some embodiments, a first electroactive material comprises a Group III element, a Group IV element, a Group V element, or a combination thereof. In some embodiments, a second electroactive material comprises boron, aluminum, silicon, germanium, tin, arsenic, antimony, phosphorus, or a mixture thereof. Additionally or alternatively, the second electroactive material may not include nitrogen.

In various embodiments, the electroactive material may comprise silicon. Such a material may be silicon, silicon oxides, and silicon containing binary and ternary alloys, such as Si—Sn, SiSnFe, SiSnAl, SiFeCo, and the like. In certain embodiments, the electroactive material comprises or consists essentially of silicon (rather than an alloy of silicon) in either crystalline or amorphous structures.

The electroactive material may have a round geometry or an axial geometry and thus may be in the form of particles or in alternative variations, may be in the form of thin film, nanowires, nanorods, nanosprings, or hollow tubes. The electroactive material structures, e.g., silicon structures, may be nanometer sized or micrometer sized. Such silicon structures can help accommodate the large volume changes that silicon undergoes during lithium cycling in a lithium ion battery. The term "axial geometry" refers to particles generally having a rod, fibrous, or otherwise cylindrical shape having an evident long or elongated axis. Generally, an aspect ratio (AR) for cylindrical shapes (e.g., a fiber or rod) is defined as AR=L/D where L is the length of the longest axis and D is the diameter of the cylinder or fiber. Exemplary axial-geometry electroactive material particles suitable for use in the present disclosure may have high aspect ratios, ranging from about 10 to about 5,000, for example. In certain variations, the electroactive material particles having an axial-geometry include fibers, wires, flakes, whiskers, filaments, tubes, rods, and the like.

The term "round geometry" typically applies to particles having lower aspect ratios, for example, an aspect ratio closer to 1 (e.g., less than 10). It should be noted that the particle geometry may vary from a true round shape and, for example, may include oblong or oval shapes, including prolate or oblate spheroids, agglomerated particles, polygonal (e.g., hexagonal) particles or other shapes that generally have a low aspect ratio. Oblate spheroids may have disc shapes that have relatively high aspect ratios. Thus, a generally round geometry particle is not limited to relatively low aspect ratios and spherical shapes. For generally round geometry electroactive material particles, an average particle size diameter of a suitable silicon-containing particle may be greater than or equal to about 20 nm to less than or equal to about 100 μm, optionally greater than or equal to about 50 nm to less than or equal to about 20 μm, optionally greater than or equal to about 100 nm to less than or equal to about 10 μm, by way of non-limiting example.

In various aspects, the method includes reacting the lithiating agent (e.g., first lithiating agent, second lithiating agent) with the electroactive material. This step of reacting the lithiating agent with the electroactive material advantageously forms a pre-lithiated electroactive material comprising a lithium-containing metallic compound or a lithium nitride-containing metallic compound instead of only a mixture of lithium and electroactive material or a mixture of lithium, nitrogen, and electroactive material. The lithium-containing metallic compound may be a lithium-containing intermetallic compound, and the lithium nitride-containing metallic compound may be a lithium nitride-containing intermetallic compound. In various aspects, the reaction between the lithiating agent and the electroactive material is a solid state reaction.

Formation of the pre-lithiated electroactive material during the reacting step can be accomplished by heating (e.g., in an oven, in a furnace, and the like) the lithiating agent (e.g., first lithiating agent, second lithiating agent) and the electroactive material (e.g., first electroactive material, second electroactive material) to a suitable temperature in the presence of a first inert gas. The heating duration may vary as determined by a person of ordinary skill in the art to achieve the reaction. The lithiating agent and the electroactive material may be heated to a temperature greater than or equal to about 350° C., greater than or equal to about 400° C., greater than or equal to about 450° C., greater than or equal to about 500° C., greater than or equal to about 550° C., greater than or equal to about 600° C., greater than or equal to about 650° C., greater than or equal to about 700° C., greater than or equal to about 750° C., greater than or equal to about 800° C., greater than or equal to about 850° C., greater than or equal to about 900° C., or about 1000° C.; from about 350° C. to about 1000° C., about 400° C. to about 900° C., about 450° C. to about 800° C., about 500 C to about 700° C., or about 550° C. to about 600° C. In some embodiments, the lithiating agent and the electroactive material may be heated to a temperature greater than or equal to the melting point of LiH (approximately 689° C.) and/or greater than or equal the melting point of Li$_3$N (approximately 813° C.).

Additionally or alternatively, formation of the pre-lithiated electroactive material during the reacting step can be accomplished by mechanically alloying the mixture in the presence of a second inert gas. In any embodiment, mechanical alloying can include a milling procedure as known in the art, for example, high energy ball milling. The type of mill, milling container, milling speed, milling time, type, size, and size distribution of the grinding medium, ball-to-powder weight ratio, milling atmosphere, and milling temperature can be adjusted as n needed by a person of ordinary skill in the art. Non-limiting examples of first and second inert gases include nitrogen, helium, and argon. The first and second inert gases may be the same or different. Optionally, the lithiating agent and the electroactive material may be pressed, for example, into a pellet, prior to the reacting step, for example, prior to heating.

In any embodiment, the resultant lithium-containing metallic compound includes the Group III element, the Group IV element, the Group V element, or a combination thereof from the initial electroactive material. For example, when the electroactive material includes silicon, after the silicon-containing electroactive material is admixed and reacted with the lithiating agent (e.g., the first lithiating agent), the lithium-containing metallic compound produced is a lithium silicide. An example of a reaction of silicon-containing electroactive material with the first lithiating agent to produce a lithium silicide is shown below in equation (1):

$$2LiH + xSi \rightarrow H_2 + Li_2Si_x \quad (1)$$

where $0.45 \leq x \leq 20$. In some embodiments, the molar ratio of LiH to Si can be about 4:1, about 3:2, about 3:1, or about 2:1. Depending on the molar ratio of LiH to Si, the lithium silicide produced can be Li$_a$Si$_b$, where $2 \leq a \leq 25$ and $0.45 \leq b \leq 20$. Examples of lithium silicides include, but are not limited to, Li$_7$Si$_3$, Li$_{13}$Si$_4$, L$_{21}$Si$_5$, Li$_{12}$S$_{17}$, Li$_{4.7}$Si$_2$, and combinations thereof.

In any embodiment, the resultant lithium nitride-containing metallic compound includes the Group III element, the Group IV element, the Group V element, or a combination thereof from the initial electroactive material. For example, when the electroactive material includes silicon, after the silicon-containing electroactive material is admixed and reacted with the lithiating agent (e.g., the second lithiating agent), the lithium-nitride containing metallic compound produced is a lithium silicon nitride. An example of a reaction of silicon-containing electroactive material with the second lithiating agent to produce a lithium silicon nitride is shown below in equation (2):

$$Li_3N + ySi \rightarrow Si_xNLi_{3-z} + zLi \quad (2)$$

where $0 < y \leq 1$ and $0 \leq z \leq 3$. In some embodiments, the molar ratio of Li$_3$N to Si can be about 4:1, about 3:2, about 3:1, or about 2:1. Depending on the molar ratio of Li$_3$N to Si, the lithium silicon nitride produced can be Li$_c$Si$_d$N$_e$, where $1 \leq c \leq 25$, $1 \leq d \leq 10$ and $2 \leq e \leq 15$. Examples of lithium silicon nitrides include, but are not limited to, Li$_2$SiN$_3$, Li$_5$SiN$_3$, LiSi$_2$N$_3$, Li$_{18}$Si$_3$N$_{10}$, Li$_{21}$Si$_3$N$_{11}$, Li$_8$SiN$_4$, and combinations thereof.

Additionally or alternatively, the method may further include admixing electrically conductive material or particles (also known as conductive filler material) with the pre-lithiated electroactive material. Suitable electrically conductive material are well known to those of skill in the art and include, but are not limited to, carbon black, graphite, carbon nanotubes, carbon fibers, graphene, graphene oxide, nitrogen-doped carbon, metallic powder (e.g., copper, nickel, steel), liquid metals (e.g., Ga, GaInSn), and combinations thereof. Such electrically conductive material in particle form may have a round geometry or an axial geometry as described above. In some embodiments, admixing of the electrically conductive material with the pre-lithiated electroactive material can include coating at least a portion of the pre-lithiated electroactive material with at least a portion of the electrically conductive material.

In additional embodiments, the method may further include admixing a polymeric binder with the pre-lithiated electroactive material and the electrically conductive material. It is also contemplated herein that additional electroactive material as described herein may also be admixed with the pre-lithiated electroactive material. The polymeric binder may be any suitable binder for use in a positive electrode, a negative electrode, and a combination thereof. Examples of a suitable polymeric binder, include, but are not limited to, poly(ether imide) (PEI), polyacrylic acid (PAA), poly(amic acid), polysulfone (PSF), polyphenylsulfone (PPSF), polyethersulfone (PESF), polyamide, polyvinylidene fluoride (PVDF), polyacrylonitrile (PAN), a polyolefin, cellulose, derivatives of cellulose (carboxymethoxyl cellulose (CMC)), cellulose acetate, pitch, lignin, polyalkylene oxide (PAO) (e.g., polyethyleneoxide (PEO) or polypropylene oxide (PPO), etc.), polyvinylidene difluoride (PVDF), polymethylmethacrylate (PMMA), polyimide (PI), polyvinylidene fluoride (PVDF), ethylene propylene diene monomer (EPDM) rubber, copolymers, and combinations thereof. As used herein, the term "polymeric binder" includes polymer precursors used to form the polymeric binder, for example, monomers or monomer systems that can form the any one of the polymeric binders disclosed above. The electrically conductive material can be admixed with the polymeric binder and the pre-lithiated electroactive material, so that the electrically conductive material is distributed throughout an electrode matrix. Notably, the electrically conductive material is typically dispersed in the polymeric binder matrix as in a typical composite. Preferably, the electrically conductive material and pre-lithiated electroactive material are well mixed into the polymeric binder for even distribution (e.g., homogeneous distribution) and therefore even electrical conductivity.

The polymeric binder, pre-lithiated electroactive material, and electrically conductive material can be blended or mixed by equipment known in the art, such as for example, magnetic stirrers, mixers, kneaders, and the like. In some embodiments, a solvent or one or more vehicles may be admixed with the polymeric binder, pre-lithiated electroactive material, and optional electrically conductive material to form a mixture. The handling and flowability of a mixture of polymeric binder, pre-lithiated electroactive material, and optional electrically conductive material can be dependent on the polymer or polymer precursor selected, the viscosity of the solvent/carriers, as well as a rate of crosslinking. Non-limiting examples of suitable solvents include N-methyl-2-pyrrolidone (NMP), dimethylformamide (DMF), dimethyl sulfoxide (DMSO), propylene carbonate (PC), acetonitrile (CAN), tetrahydrofuran (THF) and combinations thereof. In some embodiments, the solvent may be aprotic, preferably polar. The mixture may be applied to a current collector and volatilized to form an electrode. Optionally, the electrode may be pressed or calendered to reduce the porosity of the electrode. Depending on pore size, suitable porosities may range from greater than or equal to about 20% to less than or equal to about 80% porosity for an electrode (prior to being imbibed with any electrolyte).

In any embodiment, the mixture may comprise a weight ratio of pre-lithiated electroactive material to polymeric binder of about 50:1 to about 1:10, for example, about 25:1, about 10:1, about 5:1 about 2:1, about 1:1, about 2:3, about 3:2, or about 1:2. In some embodiments, pre-lithiated electroactive material may be present in the mixture in an amount, based on total weight of the mixture, of about 50 wt % to about 98 wt %, about 50 wt % to about 90 wt %, or about 70 wt % to about 90 wt %. Additionally or alternatively, the polymeric binder may be present in the mixture in an amount, based on total weight of the mixture, of about 2 wt % to about 25 wt %, about 10 wt % to about 25 wt %, or about 5 wt % to about 15 wt %. Additionally or alternatively, the electrically conductive material may be present in the mixture in an amount, based on total weight of the mixture, of about 2 wt % to about 25 wt %, about 10 wt % to about 25 wt %, or about 5 wt % to about 15 wt %

In various aspects, an electrode, e.g., a negative electrode (anode), is also provided. It is contemplated herein that the negative electrode described herein is in a state prior to incorporation and/or operation in an electrochemical cell including prior to any cycling (charge and/or discharge cycle), for example, prior to a formation process. In any embodiment, the electrode is not in a state after operation in an electrochemical cell and/or after contact with an electrolyte. The negative electrode includes pre-lithiated electroactive material including a lithium-containing metallic compound as described herein, a lithium nitride-containing metallic compound as described herein, or a combination thereof. For example, the lithium-containing metallic compound or the lithium nitride-containing metallic compound each independently can include a Group III element (B, Al, or a combination thereof), a Group IV element (e.g., Si, Ge, Sn, or a combination thereof), a Group V element (e.g., As, Sb, P, or a combination thereof), or a combination thereof. In various embodiments, the lithium-containing metallic compound can be a lithium silicide, such as, but not limited to $Li_7Si_3$, $Li_{13}Si_4$, $L_{21}Si_5$, $Li_{12}Si_7$, $Li_{4.7}Si_2$, or combinations thereof. In various embodiments, the lithium nitride-containing metallic compound can be a lithium silicon nitride, such as, but not limited to, $LiSi_2N_3$, $Li_5SiN_3$, $Li_2SiN_3$, $Li_{18}Si_3N_{10}$, $Li_{21}Si_3N_{11}$, $Li_8SiN_4$, or combinations thereof. In any embodiment, the lithium in the lithium-containing metallic compound and the lithium in the lithium nitride-containing metallic compound are each derived from or originates from LiH, $Li_3N$, or a combination thereof, for example, via a method of pre-lithiating electroactive material as described above.

The negative electrode may optionally include electrically conductive material as described herein (e.g., carbon black, graphite, carbon nanotubes, carbon fibers, nitrogen-doped carbon, and combinations thereof) as well as an optional polymeric binder as described herein. In some embodiments, at least a portion of the electrically conductive material can coat at least a portion of the pre-lithiated electroactive material.

A concentration of pre-lithiated electroactive material in the negative electrode may optionally range from greater than or equal to about 20 mass % to less than or equal to about 98 mass % of the total mass of the electrode, for example, about 40 mass % to about 98 mass % of the total mass of the electrode, about 50 mass % to about 98 mass % of the total mass of the electrode, or about 60 mass % to about 95 mass % of the total mass of the electrode. As appreciated by those of skill in the art, the concentration of pre-lithiated electroactive material require can vary depending on particle size and the like. A concentration of electrically conductive material in the negative electrode may be correlated to a percolation threshold, which varies with particle size, particle resistivity or conductivity, and geometry or particle shape, as recognized by those of skill in the art. In certain variations, a concentration of electrically conductive material in the electrode can range from greater than or equal to about 2 mass % to less than or equal to about 30 mass % or from greater than or equal to about 2 mass % to less than or equal to about 20 mass % of the total mass of the electrode.

An amount of polymeric binder in the electrode may range from greater than or equal to about 2 mass % to less than or equal to about 50 mass %, or from greater than or equal to about 2 mass % to less than or equal to about 10 mass % of the total mass of the electrode. Generally, the smaller the particle size of the pre-lithiated electroactive material and/or electrically conductive material, the greater the amount of polymeric binder that is used.

In various aspects, an electrochemical cell (e.g., lithium ion battery) including the negative electrode comprising pre-lithiated electroactive material as described herein is also provide. The electrochemical cell can include additional components, for example, as shown in FIG. 1, including a positive electrode as described herein (e.g., positive electrode 24) and a separator as described herein (e.g., separator 22).

The methods disclosed herein are especially well-suited to maximizing specific power and energy density of electrochemical cells, such as lithium ion batteries. Therefore, the inventive electrode materials have certain advantages, like high energy density and high rate capabilities.

EXAMPLES

In the examples below, all handling of powders was carried out in an argon filled glove box and include, but are not limited to weighing, pressing, heating and grinding. Some operations that were carried out in an air tight container were performed outside of the glove box include, but not are limited to mixing and x-ray diffraction data collection. In those cases, loading and unloading the air tight containers were carried out in an argon filled glove box.

Example 1

Figure 2:
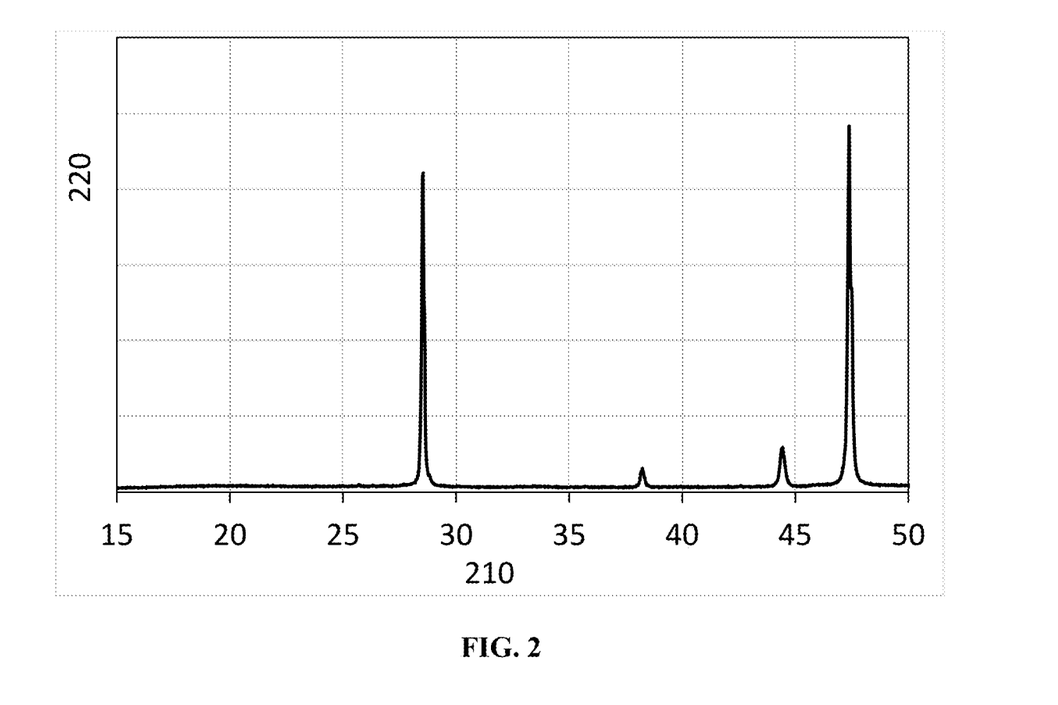
FIG. 2 provides an X-ray diffraction (XRD) pattern for Mixture A (lithium hydride and silicon particles mixture in 4:1 molar ratio).
Figure 3:
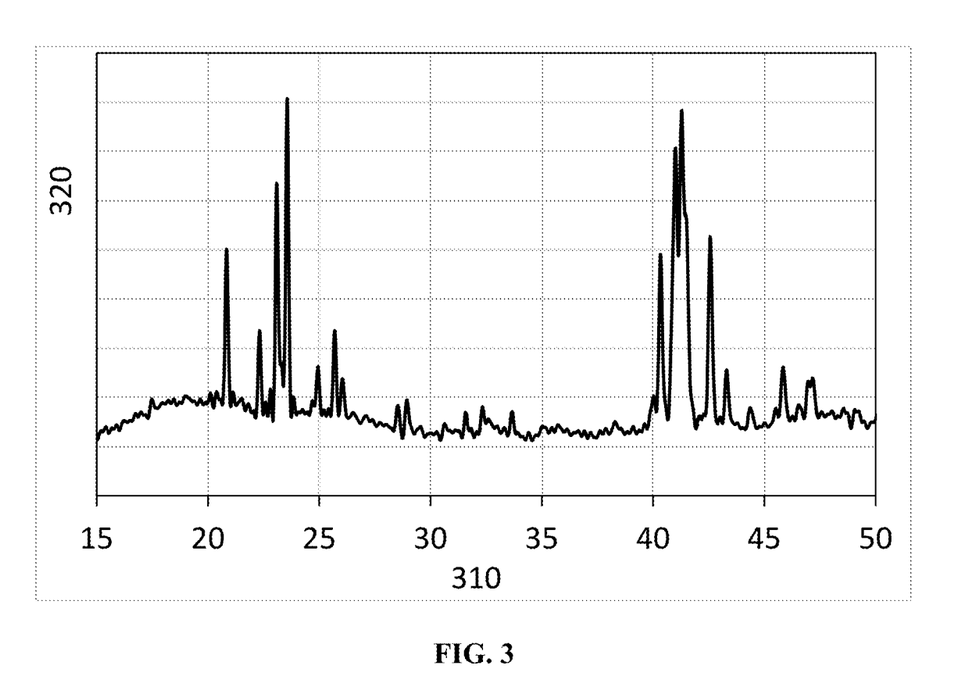
FIG. 3 provides an XRD pattern for Powder A including a mixture of $Li_{13}Si_4$ and $Li_{21}Si_5$.

Lithium hydride (nominally 95% purity, 30 mesh powder from Sigma Aldrich) and silicon particles (nominally 5 μm particle size from Elkem) were mixed together for 5 minutes in a Spex 8000D mixer mill in a 4:1 molar ratio to form Mixture A. A typical x-ray diffraction (XRD) scan of Mixture A using copper k-alpha radiation is shown in FIG. 2. In FIG. 2, x-axis (210) is 2 theta (θ) (degrees), while intensity (arbitrary units (a.u.)) is shown on the y-axis (220). Mixture A was compressed into a pellet using a using a laboratory press and a steel pressing die set. The pressed pellet was heated to 560° C. in a muffle furnace for 60 minutes. Upon cooling to room temperature, the pellet was lightly ground to form Powder A using an agate mortar and pestle. The process resulted in a mixture of $Li_{13}Si_4$ and $Li_{21}Si_5$. A typical XRD scan of Powder A using copper k-alpha radiation is shown in FIG. 3. In FIG. 3, x-axis (310) is 2 theta (θ) (degrees), while intensity (arbitrary units (a.u.)) is shown on the y-axis (320).

Example 2

Figure 4:
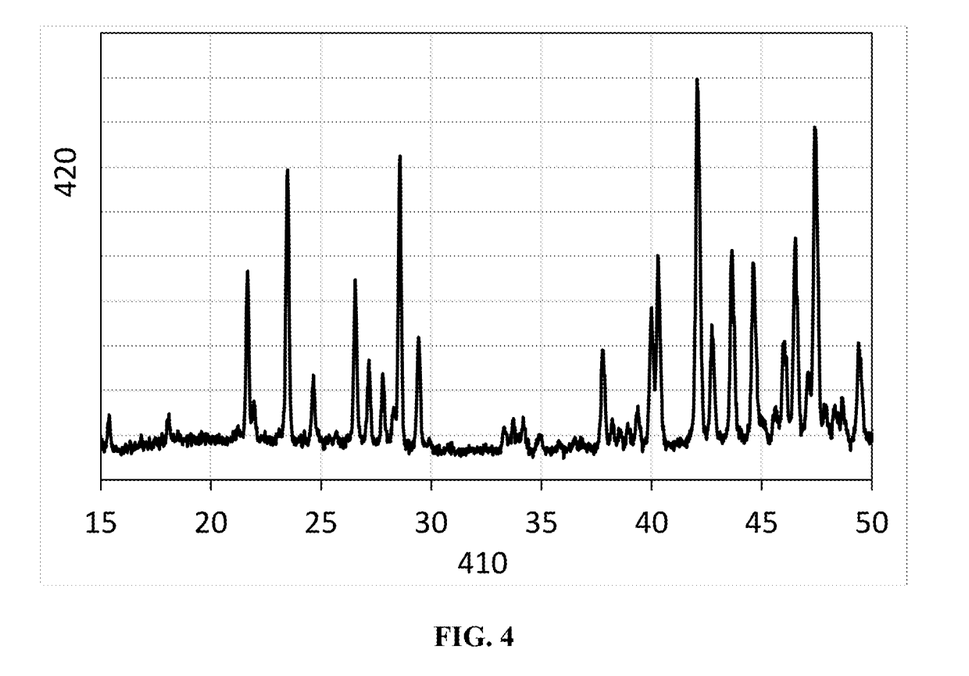
FIG. 4 provides an XRD pattern for Powder B including a mixture of $Li_{12}Si_7$ and Si.

Lithium hydride (nominally 95% purity, 30 mesh powder from Sigma Aldrich) and silicon particles (nominally 5 μm particle size from Elkem) were mixed together for 5 minutes in a Spex 8000D mixer mill in a 3:2 molar ratio to form Mixture B. Mixture B was compressed into a pellet using a using a laboratory press and a steel pressing die set. The pressed pellet was heated to 560° C. in a muffle furnace for 60 minutes. Upon cooling to room temperature, the pellet was lightly ground to form Powder B using an agate mortar and pestle. The process resulted in a mixture of $Li_{12}Si_7$ and Si. A typical XRD scan of Powder B using copper k-alpha radiation is shown in FIG. 4. In FIG. 4, x-axis (410) is 2 theta (θ) (degrees), while intensity (arbitrary units (a.u.)) is shown on the y-axis (420).

Example 3

Figure 5:
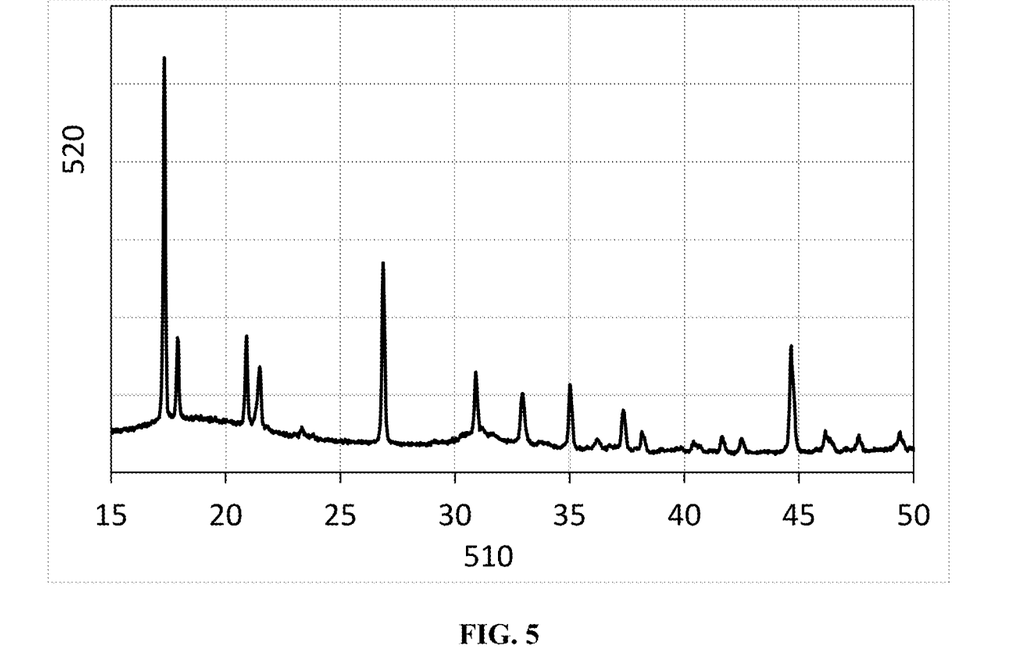
FIG. 5 provides an XRD pattern for Powder C including a mixture of $Li_2SiN_2$ and $Li_5SiN_3$.

Lithium nitride (>99.5% purity, 80 mesh powder from Sigma Aldrich) and silicon particles (nominally 5 μm particle size from Elkem) were mixed together for 5 minutes in a Spex 8000D mixer mill in a 3:1 molar ratio to form Mixture C. Mixture C was compressed into a pellet using a using a laboratory press and a steel pressing die set. The pressed pellet was heated to 900° C. in a muffle furnace for 60 minutes. Upon cooling to room temperature, the pellet was lightly ground to form Powder C using an agate mortar and pestle. The process resulted in a mixture of $Li_2SiN_2$ and $Li_5SiN_3$. A typical XRD scan of Powder C using copper k-alpha radiation is shown in FIG. 5. In FIG. 5, x-axis (510) is 2 theta (θ) (degrees), while intensity (arbitrary units (a.u.)) is shown on the y-axis (520).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of pre-lithiating an electroactive material for an electrode for an electrochemical cell, the method comprising:
   reacting a first lithiating agent comprising LiH with the electroactive material comprising silicon to form a pre-lithiated electroactive material comprising a lithium silicide.

2. The method of claim 1, wherein reacting the first lithiating agent with the electroactive material comprises one or more of:
   (i) heating the first lithiating agent and the electroactive material in the presence of a first inert gas; and
   (ii) mechanically alloying the first lithiating agent and the electroactive material in the presence of a second inert gas.

3. The method of claim 2, wherein the first lithiating agent and the electroactive material are heated to a temperature of greater than or equal to about 350° C.

4. The method of claim 1, wherein the lithium silicide is selected from the group consisting of $Li_7Si_3$, $Li_{13}Si_4$, $L_{21}Si_5$, $Li_{12}Si_7$, $Li_{4.7}Si_2$, and a combination thereof.

5. The method of claim 1 further comprising admixing an electrically conductive material with the pre-lithiated electroactive material, wherein the electrically conductive material is selected from the group consisting of carbon black, graphite, carbon nanotubes, carbon fibers, nitrogen-doped carbon, and combinations thereof.

6. The method of claim 1 further comprising:
   admixing a solvent with a polymeric binder and the pre-lithiated electroactive material to form a mixture, wherein the solvent is selected from the group consisting of: N-methyl-2-pyrrolidone (NMP), dimethylformamide (DMF), dimethyl sulfoxide, propylene carbonate, acetonitrile, tetrahydrofuran, and combinations thereof; and
   applying the mixture to a current collector and volatilizing the mixture to form the electrode.

\* \* \* \* \*